US012793083B2

(12) United States Patent
Makofsky et al.

(10) Patent No.: US 12,793,083 B2
(45) Date of Patent: Nov. 10, 2026

(54) PREDICTIVE SUSTAINABILITY ANALYTICS FOR SOFTWARE DEPLOYMENTS

(71) Applicant: NBCUniversal Media, LLC, New York, NY (US)

(72) Inventors: Steven Makofsky, Sammanish, WA (US); Christopher Swisher, Maplewood, NJ (US); Jeffrey Szuba, Scarsdale, NY (US)

(73) Assignee: NBCUniversal Media, LLC., New York, NY (US)

( * ) Notice: Subject to any disclaimer, the term of this patent is extended or adjusted under 35 U.S.C. 154(b) by 265 days.

(21) Appl. No.: 18/343,297

(22) Filed: Jun. 28, 2023

(65) Prior Publication Data

US 2025/0005595 A1 Jan. 2, 2025

(51) Int. Cl.
*G06Q 30/018* (2023.01)
*G06F 8/60* (2018.01)

(52) U.S. Cl.
CPC ............. *G06Q 30/018* (2013.01); *G06F 8/60* (2013.01)

(58) Field of Classification Search
CPC ................................ G06Q 30/018; G06F 8/60
USPC .......................................................... 705/317
See application file for complete search history.

(56) References Cited

U.S. PATENT DOCUMENTS 10,146,524 B1 * 12/2018 Killmon .................... G06F 8/65
2022/0326924 A1 * 10/2022 Mahoney ............ H04L 41/0843
2023/0059038 A1 * 2/2023 Sidhu ................. G06Q 30/0282
2023/0359970 A1 * 11/2023 Bachman ............... G16C 20/20
2024/0037002 A1 * 2/2024 Aurongzeb ............. G06F 9/542
2024/0037564 A1 * 2/2024 Aurongzeb .......... G06Q 30/018
2024/0112199 A1 * 4/2024 Sudakovitch ........ G06Q 30/018

FOREIGN PATENT DOCUMENTS

AU 2021106485 A4 * 11/2021 ............. G06Q 50/06
EP 4057144 A1 * 9/2022 ............... G06F 8/63

OTHER PUBLICATIONS

Mytton, David; "MyttonAssessing the suitability of the Greenhouse Gas Protocol for calculation of emissions from public cloud computing workloads", Aug. 8, 2020, Journal of Cloud Computing: Advances, Systems and Applications, 11 pages (Year: 2020).*

(Continued)

*Primary Examiner* — Shannon S Campbell
*Assistant Examiner* — Freda A Nelson
(74) *Attorney, Agent, or Firm* — Fletcher Yoder, P.C.

(57) ABSTRACT

A greenhouse gas (GHG) emissions estimation system is designed to train and utilize an artificial intelligence (AI) model to estimate the GHG emissions associated with operating a software application that is deployed (or is intended to be deployed) within a virtualized environment. For example, a software developer may utilize the GHG emissions estimation system as part of a cost/benefit analysis of different software solutions at an early stage of application design and development. Since there may be a variety of possible infrastructural options for a given software application, the GHG emissions estimation system enables the developer to estimate the GHG emissions associated with each infrastructural option, which can be used when determining which solution should be developed and deployed.

20 Claims, 4 Drawing Sheets

(56) References Cited

OTHER PUBLICATIONS

Bierlaire, Olivier, “Carbon Aware Cloud”, Mar. 7, 2023, medium.com, 19 pages (Year: 2023).*
“Carbonifer: estimate carbon footprint Terraform projects”, Feb. 3, 2023, reddit.com, 7 pages. (Year: 2023).*
Carbonifer.io. , May 7, 2023, Wayback Machine. (Year: 2023).*
Mytton, David; “Assessing the suitability of the Greenhouse Gas Protocol for calculation of emissions from public cloud computing workloads”, Aug. 8, 2020, Journal of Cloud Computing: Advances, Systems and Applications, 11 pages (Year: 2020).*
Budennyy et al. “Carbon Emissions Tracking of Machine Learning Models as the First Step Towards Sustainable AI”, Doklady Mathematics, Nov. 1, 2022, vol. 106, Suppl. 1, pp. S118-S128, 11 pages (Year: 2022).*

* cited by examiner

90

PREDICTIVE SUSTAINABILITY ANALYTICS FOR SOFTWARE DEPLOYMENTS

BACKGROUND

This disclosure relates generally to determining predictive sustainability analytics for software deployments, and more specifically to estimating a greenhouse gas (GHG) emission footprint for software solutions that are deployed (or are intended to be deployed) in virtualized environments.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many organizations are interested in determining the climate impact of various operations. For example, a company may operate a computer-implemented system that monitors energy utilization of a technical system deployed in production, and that estimates a GHG emission footprint of the deployed technical system as a function of energy utilization. In another example, when a future system deployment has a simple hardware configuration (e.g., a single, standalone server), a company may estimate the GHG emission footprint of the future system deployment as a function of the manufacturer-supplied energy utilization specifications of the hardware.

However, it is increasingly common for certain technical systems to be deployed within virtualized environments. For example, a virtualized environment can be implemented using hardware servers disposed within a remote data center or an on-premises data center. Rather than executing software applications on dedicated data center hardware, a software application may instead execute within a virtualized environment that is hosted on the hardware of the data center, in which various computing (e.g., processor, memory, networking) resources of the data center are dynamically allotted to one or more virtual machines of the virtualized environment to execute the software application. It is presently recognized that, for organizations that deploy software applications in virtualized environments, there is not a solution to estimate the GHG emission footprint of the technical systems deployed within the virtualized environment.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with an embodiment of the present disclosure, a computing system includes at least one memory configured to store an artificial intelligence (AI) model, and includes at least one processor configured to execute stored instructions to perform actions. The actions include receiving a request to determine estimated greenhouse gas (GHG) emissions of an application when deployed in a virtualization environment, wherein the request indicates at least one application file of the application. The actions include analyzing the at least one application file of the application to determine infrastructural components and operational parameters of the application. The actions also include generating, using the AI model, the estimated GHG emissions of the application when deployed in the virtualization environment, based on the infrastructural components and operational parameters of the application. The actions further include providing a response to the request that includes at least the estimated GHG emissions of the application when deployed in the virtualization environment.

In accordance with an embodiment of the present disclosure, a computer-implemented method includes receiving a request to determine estimated GHG emissions of an application when deployed in a virtualization environment, wherein the request indicates at least one application file of the application. The method includes analyzing the at least one application file of the application to determine infrastructural components and operational parameters of the application. The method also includes generating, using an AI model, the estimated GHG emissions of the application when deployed in the virtualization environment, based on the infrastructural components and operational parameters of the application. The method further includes providing a response to the request that includes at least the estimated GHG emissions of the application when deployed in the virtualization environment.

In accordance with an embodiment of the present disclosure, a non-transitory, computer-readable medium storing instructions executable by a processor of a computing system. The instructions comprising instructions to receive a request to determine estimated GHG emissions of an application when deployed in a virtualization environment, wherein the request indicates at least one application file of the application. The instructions comprise instructions to analyze the at least one application file of the application to determine infrastructural components and operational parameters of the application. The instructions comprise instructions to generate, using an artificial intelligence (AI) model, the estimated GHG emissions of the application when deployed in the virtualization environment, based on the infrastructural components and operational parameters of the application. The instructions comprise instructions to provide a response to the request that includes at least the estimated GHG emissions of the application when deployed in the virtualization environment.

In accordance with an embodiment of the present disclosure, a computing system includes at least one memory configured to store an artificial intelligence (AI) model and at least one processor configured to execute stored instructions to perform actions. The actions comprise training the AI model to encode relationships between respective infrastructural components and operational parameters of a set of deployed applications and respective greenhouse gas (GHG) emissions of the set of deployed applications, yielding a trained AI model. The actions further include generating, using the trained AI model, estimated GHG emissions of an application when deployed in a virtualization environment, based on infrastructural components and operational parameters of the application.

DRAWINGS

These and other features, aspects, and advantages of the present invention will become better understood when the following detailed description is read with reference to the accompanying drawings in which like characters represent like parts throughout the drawings, wherein.

Figure 3:
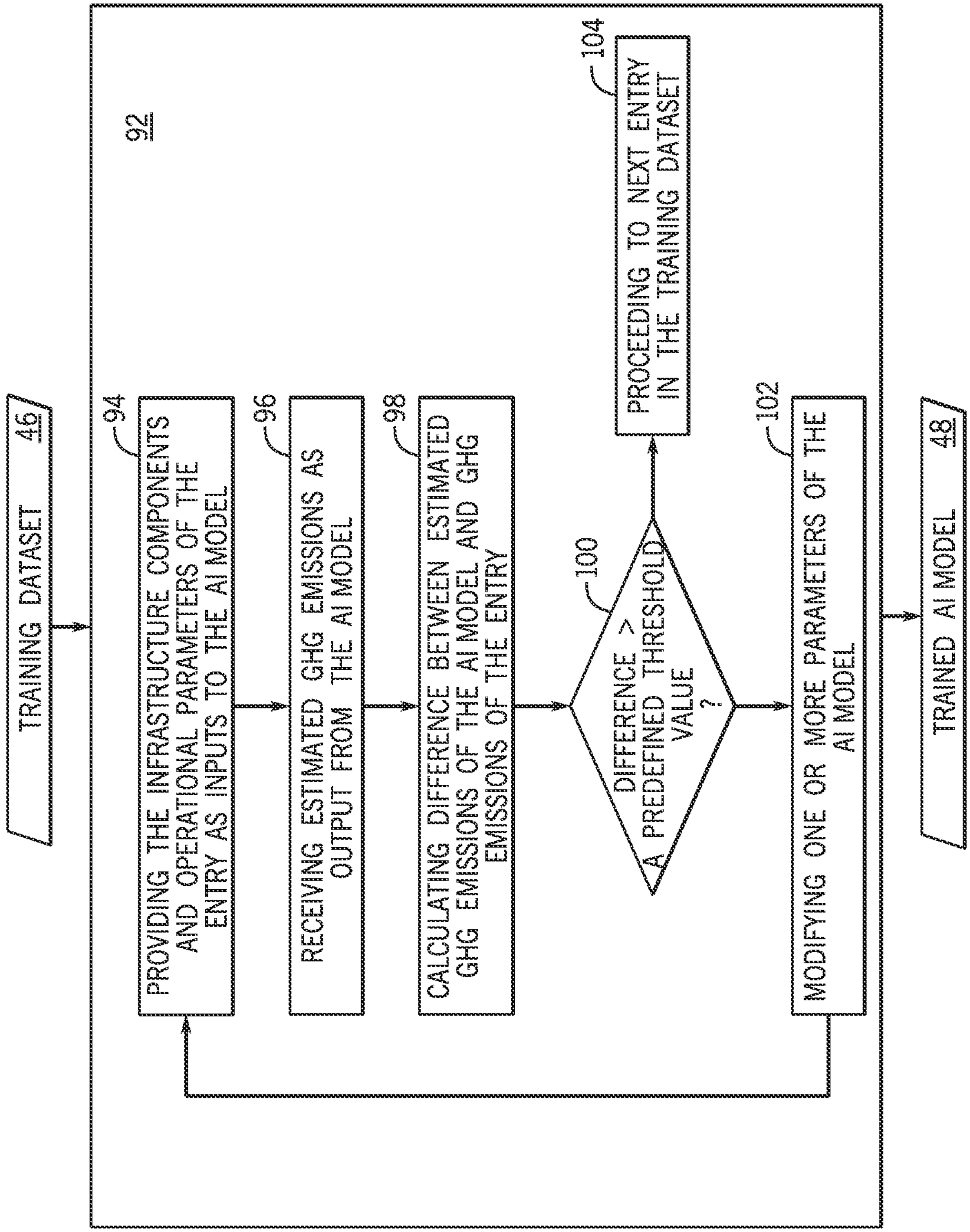
Figure 4:
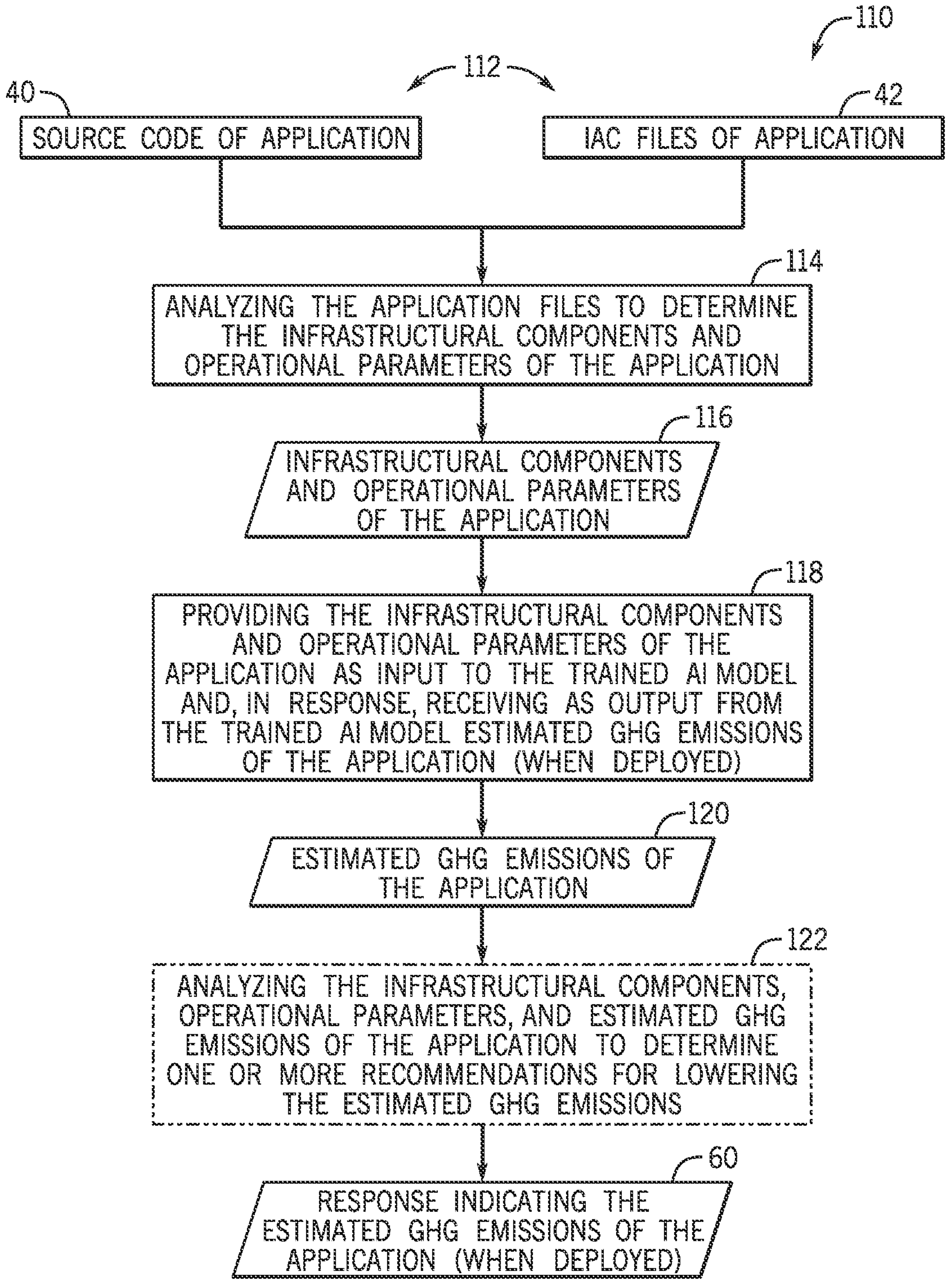

FIG. 3 is a flow diagram of an example process for training the AI model using the training dataset, in accordance with embodiments of the present technique; and FIG. 4 is a flow diagram of an example process in which the GHG emissions estimation system uses the trained AI model in predictive mode to estimate GHG emissions of an application (when deployed), in accordance with embodiments of the present technique.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted above, there remains a need for a solution capable of estimating the GHG emission footprint of software applications that are deployed (or are intended to be deployed) within a virtualized environment. With this in mind, present embodiments are directed to a GHG emissions estimation system that is designed to estimate the GHG emissions associated with operating a software application that is deployed (or is intended to be deployed) within a virtualized environment. For example, a software developer may utilize the GHG emissions estimation system as part of a cost/benefit analysis of different software solutions. Since there may be a variety of possible infrastructural options for a given software application, the GHG emissions estimation system enables the developer to estimate the GHG emissions associated with each infrastructural option, which can be used when determining which solution should be developed and deployed.

Figure 1:
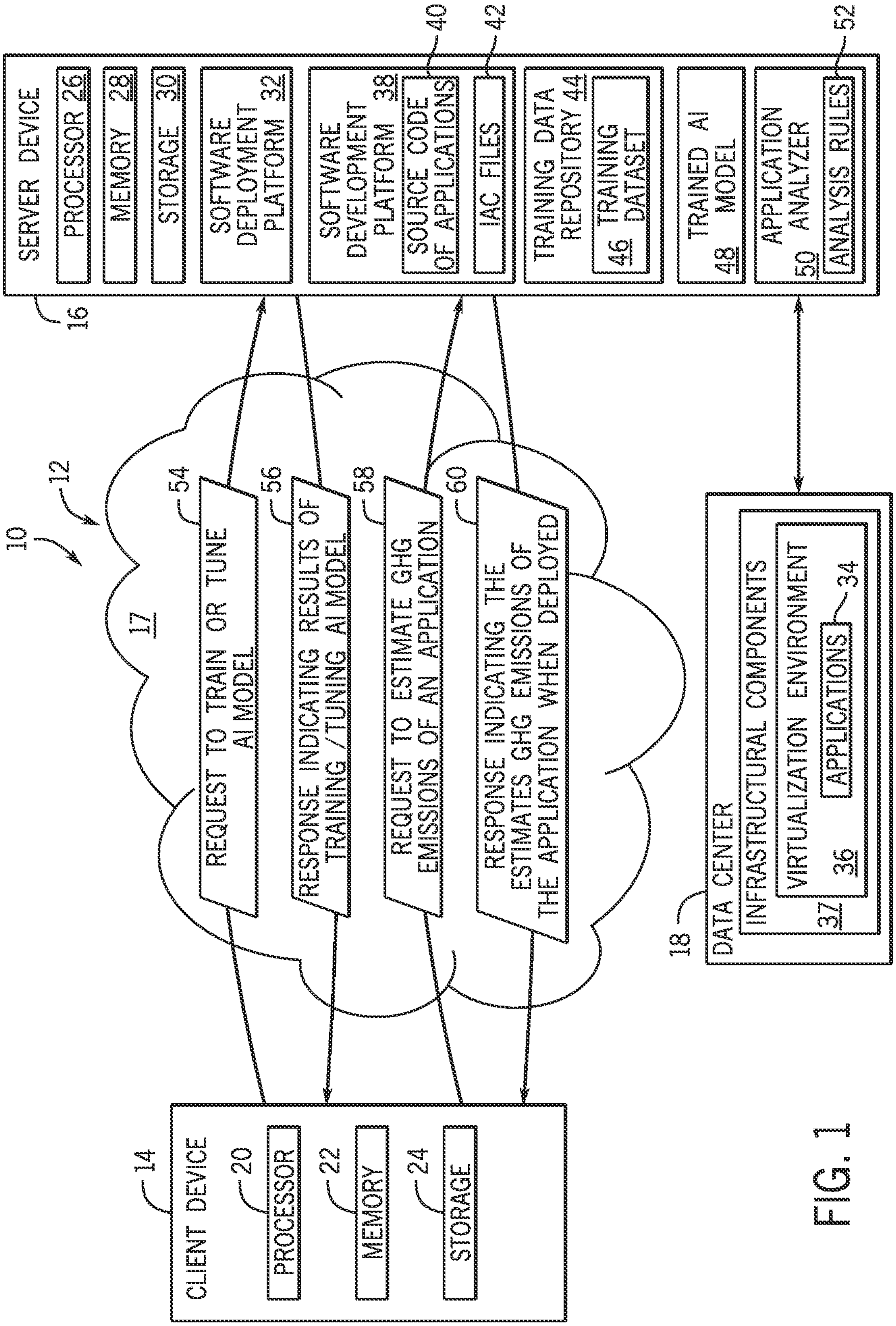
FIG. 1 is a diagram of an example GHG emissions estimation system implemented in a client-server architecture, in accordance with embodiments of the present technique.

FIG. 1 is a diagram of an embodiment of a GHG emissions estimation system 10 implemented in a client-server architecture 12. While the illustrated embodiment is implemented within the client-server architecture 12, it may be appreciated that, in other embodiments, the GHG emissions estimation system 10 may be implemented as an application that is locally stored and executed by a stand-alone client device. For the illustrated embodiment, the client-server architecture 12 includes at least one client device 14 that is communicatively coupled to at least one server device 16 (also referred to herein as simply "server") via suitable network 17. In certain embodiments, the server 16 is communicatively coupled to a data center 18 (e.g., a remote or on-premises data center), while in other embodiments, the server 16 may be a hardware or virtual server of the data center 18.

In certain embodiments, the client device 14 may be a desktop computer, a laptop computer, a smart phone, or another suitable computing device. In certain embodiments, the server 16 may be a stand-alone server, or may be a virtualized server hosted by a remote or on-premises data center. The network 17 may include a wide-area network (WAN), a local-area network (LAN), a virtual private network (VPN), the internet, another suitable wired and/or wireless network, or any suitable combination thereof.

For the embodiment illustrated in FIG. 1, the client device 14 includes at least one processor 20 (e.g., a central processing unit (CPU), a graphic processing unit (GPU)), at least one memory 22 (e.g., random access memory (RAM), read-only memory (ROM)), and at least one storage 24 (e.g., a hard disk drive (HDD), a solid-state disk (SSD), flash memory). The storage 24 of the client device 14 may store suitable applications or apps that are executed by the processor 20 to provide desired functionality at the client device 14. For example, the storage 24 of the client device 14 may store a client web browser, or another suitable application, that can be loaded into memory 22 and executed by the processor 20 to enable the client device 14 to interact with services hosted by the server 16.

For the embodiment illustrated in FIG. 1, the server 16 includes at least one processor 26 (e.g., a CPU, a GPU), at least one memory 28 (e.g., RAM, ROM), and at least one storage 30 (e.g., a HDD, SSD, flash memory). For embodiments in which the server 16 is a virtualized server hosted by a remote or on-premises data center, the at least one processor 26, at least one memory 28, at least one storage 30, and so forth, may be infrastructural components or computing resources allocated to one or more virtual machines of a virtualized environment. The storage 30 includes a number of elements that may be loaded into the memory 28 and/or executed by the processor 26 to enable different functionality discussed herein. The client device 14 and/or the server 16 may include other suitable computing devices or components (e.g., networking devices or interfaces, input devices, output devices) in different implementations.

For the embodiment illustrated in FIG. 1, the server 16 hosts a software deployment platform 32 that is responsible for deploying applications 34 within a virtualization environment 36 that operates using the infrastructural components 37 (e.g., processors, memory, storage, networking components) of the data center 18. The deployed applications 34 may include, but are not limited to, web serving applications, user interface applications, cloud-based applications, e-commerce applications, and so forth, which are executed by the processor 26 to provide desired functionality to the client via the client device 14. The server 16 also hosts a software development platform 38 that stores source code 40 for the deployed applications 34 of the software deployment platform 32, and for applications that have not yet been deployed (e.g., applications still under development). The software development platform 38 stores one or more corresponding infrastructure-as-code (IAC) files 42 for the applications that are deployed or under development. As used herein, "source code" may refer to application instructions (e.g., human-readable instructions, machine-readable instructions, or both) for compiled programming languages, interpreted or scripted programming languages, or any combination thereof. The IAC files 42, also known as infrastructure-as-code templates, are industry standard for application deployment within a virtual environment, and are typically provided in a YAML format. The IAC files 42 are used by the software deployment platform 32 to define the various infrastructural components 37 of the data center 18 that an application is designed to use during operation within the virtualization environment 36. In certain embodiments, the server 16 may only include either the software deployment platform 32 or the software development platform 38. In some embodiments, the server 16 may lack the software development platform 38 and/or the software deployment platform 32, wherein the server 16 is communicatively coupled to one or more other computing systems hosting the software development platform 38 and/or the software deployment platform 32 to enable the functionality described herein.

For the embodiment illustrated in FIG. 1, the server 16 also hosts a training data repository 44 that stores a training dataset 46, which may be generated as discussed below with respect to FIG. 2. As discussed below with respect to FIG. 3, the training dataset 46 is used to train an AI model, yielding the trained AI model 48. As discussed below with respect to FIG. 4, the trained AI model 48 is subsequently used by the GHG emissions estimation system 10 in predictive mode to estimate the GHG emissions associated with operating an application within the virtualization environment 36. The AI model may be based on a supervised or unsupervised learning regression algorithm, such as a decision tree model, a random forest (RF) model, a support vector machine (SVM) model, a linear regression model, an artificial neural network (ANN) model, a convolutional neural network (CNN) model, a recurrent neural network (RNN) model, or another suitable model.

For the embodiment illustrated in FIG. 1, the server 16 also hosts an application analyzer 50. In certain embodiments, the application analyzer 50 is a software component having instructions that, when executed by the processor 26 of the server 16, applies a set of analysis rules 52 to analyze the source code 40 and/or the IAC files 42 associated with an application to determine infrastructural components and operational parameters of the application when deployed in the virtualization environment 36. For example, the analysis rules 52 indicate which infrastructural components and operational parameters should be determined for an application based on the resource requirements (e.g., number of virtual machines, number or type of processors, memory space, storage space, network bandwidth) defined within the IAC files of the application. In certain embodiments, the analysis rules 52 may additionally or alternatively indicate which infrastructural components and operational parameters should be determined for an application based on supporting systems (e.g., load balancers, web servers, database servers) that are used by the application during operation, as determined based on the contents of the source code and/or IAC files of the application. During operation, the application analyzer 50 may determine that a portion of the source code and/or IAC files of an application matches a condition defined by one of the analysis rules 52, and in response, may determine one or more infrastructural components and/or operational parameters of the application as defined by the matched analysis rule. In some embodiments, rather than being a rule-based application analyzer 50, the application analyzer 50 may instead be an AI-based application analyzer 50 having an AI model that is trained to receive the IAC files and/or source code of an application as inputs, and to provide an output that indicates the infrastructural components and operational parameters of the application.

For the embodiment illustrated in FIG. 1, the server 16 may receive a request 54 from the client device 14 to train and/or tune an AI model to yield the trained AI model 48. After training or tuning the AI model, the server 16 may provide a response 56 indicating results of the training or tuning of the AI model. For example, the response 56 may indicate an accuracy of the trained AI model with respect to the training dataset or a number of iterations (or amount of processing time) utilized during the training process. After the AI model is trained or tuned, the server 16 may receive a request 58 to estimate the GHG emissions associated with the operation of an application that has been deployed (or is intended to be deployed) in the virtualization environment 36. After using the trained AI model 48 to determine the GHG emissions associated with the operation of the application, the server 16 may provide a response 60 indicating the estimated GHG emissions. In some embodiments, the response 60 may also include one or more recommendations regarding changes that could be made to the source code 40 or the IAC files 42 of the application to reduce the estimated GHG emissions of the application during operation.

Figure 2:
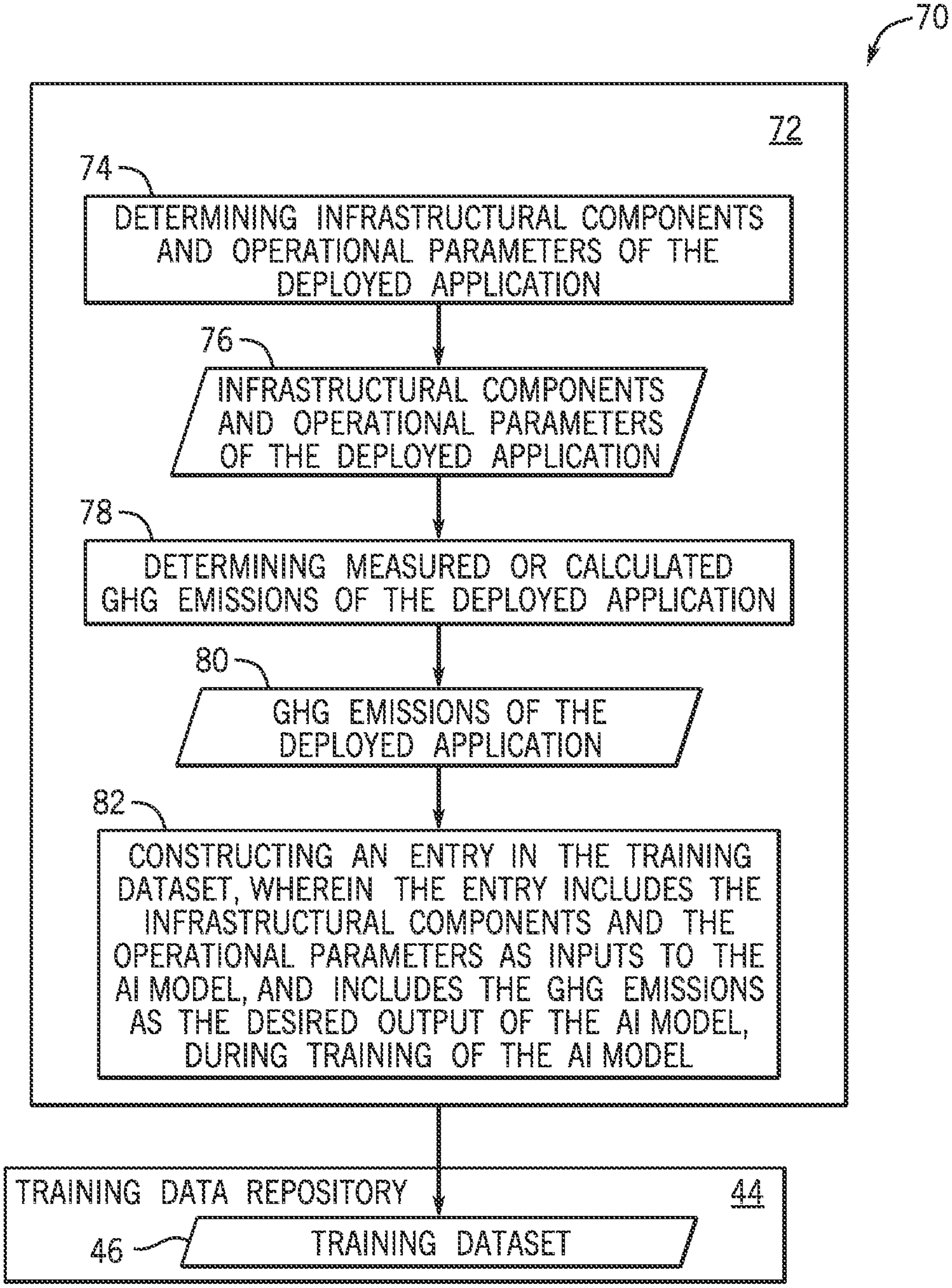
FIG. 2 is a flow diagram of an example process for generating a training dataset for training an AI model of the GHG emissions estimation system, in accordance with embodiments of the present technique.

FIG. 2 is a flow diagram of an embodiment of process 70 whereby the GHG emissions estimation system 10 generates the training dataset 46. The process 70 may be at least partially stored as software instructions within the memory 28 and executed by the processor 26 of the server 16 of the GHG emissions estimation system 10. In other embodiments, the process 70 may include additional actions, fewer actions, repeated actions, actions taken in a different sequence, and so forth, in accordance with the present disclosure. The process 70 is discussed with reference to elements illustrated in FIG. 1.

For the embodiment illustrated in FIG. 2, the process 70 includes performing a number of actions with respect to each deployed application of a set of deployed applications, as indicated by block 72. In certain embodiments, the set of deployed applications includes all of the applications 34 deployed by the software deployment platform 32, while in some embodiments, the set of deployed applications includes only a subset of the applications 34 deployed by the software deployment platform 32. For the illustrated embodiment, the actions of block 72 include the processor 26 determining (block 74) infrastructural components and operational parameters 76 of the deployed application. The infrastructural components and operational parameters 76 indicate which of the infrastructural components 37 of the data center 18 are used by, and how these infrastructural components are configured for, the deployed application during operation within the virtualization environment 36. For example, in certain embodiments, the processor 26 may execute the application analyzer 50 to apply the analysis rules 52 to the IAC files 42 and/or source code 40 of the application to determine the infrastructural components and operational parameters 76 of the deployed application. In other embodiments, in block 74, the processor 26 may receive inputs from a user manually defining the infrastructural components and operational parameters of the deployed application.

For the embodiment illustrated in FIG. 2, the actions of block 72 of the process 70 include the processor 26 determining (block 78) measured or calculated GHG emissions 80 of the deployed application based on the infrastructural components and operational parameters 76. In certain embodiments, the processor 26 may receive inputs from a user manually defining the measured or calculated GHG emissions 80 of the deployed application. In some embodiments, at least a portion of the information used to calculate the GHG emissions 80 of the deployed application may be automatically retrieved by the processor 26. For example, in some embodiments, the processor 26 may receive or retrieve energy utilization data as tracked by the remote or on-premises data center 18 hosting the virtualization environment 36 using application and hardware metrics, and/or receive or retrieve data regarding the corresponding GHG emissions per unit of power consumed (e.g., per kilowatt hour (kWh)) based on the sources of energy (e.g., solar/wind, natural gas, diesel, coal) used by a utility to generate the energy consumed by the data center 18. In some embodiments, the processor 26 may use this data to automatically calculate the GHG emissions 80 of the deployed application, or at least a first approximation that may be subsequently modified based on user input.

For the embodiment illustrated in FIG. 2, the actions of block 72 of the process 70 include the processor 26 constructing (block 82) or generating an entry in the training dataset 46 for the deployed application. The entry includes the infrastructural components and the operational parameters 76 of the deployed application as inputs to be provided to the AI model during training, and includes the GHG emissions 80 of the deployed application as the desired output of the AI model in response to these inputs during training. Within block 72, the actions of blocks 74, 78, and 82 are repeated for each deployed application of the set, or a subset thereof, and the respective entries are combined to generate the training dataset 46. The training dataset 46 may be stored as a database table, spreadsheet, comma-separated value (CSV) file, or another suitable file or data format within the training data repository 44. In certain embodiments, the process 70 may be performed regularly, such as in response to updated GHG emission data becoming available for one or more deployed applications.

In an aspect, the GHG emission data may be specific to a virtual environment service provider. As such, when developing the training dataset, the processor 26 may receive infrastructural components and parameters associated with different virtual environment service providers and the corresponding GHG emission data for the infrastructural components and parameters associated with the different service providers. The processor 26 may generate associations among different infrastructural components and parameters across different service providers so as to be able to identify equivalent infrastructural components and parameters across different service providers.

FIG. 3 is a flow diagram of an embodiment of a process 90 whereby the processor 26 of the server 16 of the GHG emissions estimation system 10 trains the AI model using the training dataset 46 to "learn" or encode relationships between respective infrastructural components and operational parameters and respective greenhouse gas (GHG) emissions of the set of deployed applications 34. The process 90 may be stored as software instructions within the memory 28 and executed by the processor 26 of the server 16 of the GHG emissions estimation system 10. In other embodiments, the process 90 may include additional actions, fewer actions, repeated actions, actions taken in a different sequence, and so forth, in accordance with the present disclosure. The process 90 is discussed with reference to elements illustrated in FIGS. 1 and 2. The process 90 receives as input the training dataset 46 generated by the process 70 of FIG. 2.

For the embodiment illustrated in FIG. 3, the process 90 includes performing a number of actions with respect to each entry of the training dataset 46, as indicated by block 92. For the illustrated embodiment, the actions of block 92 include the processor 26 providing (block 94) the infrastructural components and operational parameters of the entry as inputs to the AI model. In response, the processor 26 receives (block 96) the estimated GHG emissions as output from the AI model. The actions of block 92 further include the processor 26 calculating (block 98) a difference between the estimated GHG emissions output by the AI model and measured or calculated GHG emissions of the entry.

For the embodiment illustrated in FIG. 3, the actions of block 92 of the process 90 include decision block 100, in which the processor 26 determines whether the calculated difference is greater than a predefined threshold value. For example, the predefined threshold value may be a maximum acceptable error threshold value that is defined in a configuration of the server 16 of the GHG emissions estimation system 10. When, in decision block 100, the processor 26 determines that the difference is greater than the predefined threshold value, the processor 26 responds by modifying (block 102) one or more parameters of the AI model, before returning to block 94. For example, modifying the parameters of the AI model may include adjusting one or more values (e.g., weights, coefficients) of the AI model, altering a structure of the AI model (e.g., adding/removing neural network layers, adding/removing neural network nodes), or any combination thereof. As such, for each entry of the training dataset, or a subset thereof, the processor 26 repeats the actions of blocks 94, 96, and 98 until the difference between the estimated GHG emissions output by the AI model and measured or calculated GHG emissions of the entry is less than or equal to the predefined threshold value, at which time the processor 26 proceeds (block 104) to the next entry of the training dataset 46. Once all of the or a sufficient number of entries have been processed in block 92, the parameters of the AI model are stored as the trained AI model 48, which is ready for predictive mode operation. In certain embodiments, the process 90 may be performed regularly, such as in response to the training dataset 46 being updated to include new GHG emission data for one or more of the deployed applications 34.

FIG. 4 is a flow diagram of an embodiment of a process 110 whereby the processor 26 of the server 16 of the GHG emissions estimation system 10 uses the trained AI model 48 to estimate GHG emissions of an application that is deployed (or is intended to be deployed) in the virtualization environment 36. The process 110 may be stored as software instructions within the memory 28 and executed by the processor 26 of the server 16 of the GHG emissions estimation system 10. In other embodiments, the process 110 may include additional actions, fewer actions, repeated actions, actions performed in a different sequence, and so forth, in accordance with the present disclosure. The process 110 is discussed with reference to elements illustrated in FIGS. 1-3. In certain embodiments, the process 110 may be executed in response to the request 58 from the client device 14 to estimate the GHG emissions of an application, as illustrated in FIG. 1, wherein the application to be evaluated is indicated, or the IAC files and/or source code of the application is included as part of the request 58.

For the embodiment illustrated in FIG. 4, the process 110 receives, as input, one or more application files 112. For the illustrated embodiment, the application files 112 include the source code 40 of the application and the IAC files 42 of the application. In some embodiments, the application files 112 may only include the IAC files 42 of the application. The process 110 begins with the processor 26 analyzing (block 114) the application files 112 to determine the infrastructural components and operational parameters 116 corresponding to the application(s) of the application files 112. The infrastructural components and operational parameters 76 indicate which of the infrastructural components 37 of the data center 18 will be used, and how these infrastructural components will be configured and used, by the application(s) during operation within the virtualization environment 36. For example, in certain embodiments, the processor 26 may execute the application analyzer 50 to apply the analysis rules 52 to the application files 112 (e.g., IAC files 42, and/or source code 40) to determine the infrastructural components and operational parameters 116 of the application(s). The process 110 continues with the processor 26 providing (block 118) the infrastructural components and operational parameters 116 of the application(s) as input to the trained AI model 48 and, in response, receiving as output from the trained AI model 48 the estimated GHG emissions 120 of the application(s).

In certain embodiments, the process 110 includes the processor 26 analyzing (block 122) the infrastructural components and operational parameters 116 of the application(s), and the estimated GHG emissions 120 of the application(s) to determine one or more recommendations for lowering the estimated GHG emissions 120. For example, in certain embodiments, the processor 26 may evaluate the relative contributions of each of the infrastructural components and operational parameters 116 to the estimated GHG emissions 120 to generate an ordered list of the infrastructural components and operational parameters 116 organized from largest contributions to smallest contributions with respect to the estimated GHG emissions, which can be used by a software developer to identify areas for improvement. In an example embodiment, the processor 26 may determine the relative contribution of each of the infrastructural components and operational parameters 116 to the estimated GHG emissions 120 by iteratively removing (or replacing) one of the infrastructural components and operational parameters 116 and providing the modified set of infrastructural components and operational parameters as input to the trained AI model 48 to determine the corresponding estimated GHG emissions after each modification. In some embodiments, the processor 26 may apply one or more optimization rules that compare the infrastructural components and operational parameters 116 of the application(s) to known values, and when a match is identified, generate recommendations regarding the match. For example, when an optimization rule is triggered by the infrastructural components and operational parameters 116 of the application(s), the optimization rule may generate a recommendation indicating that the matched infrastructural component or operational parameter is known to be a large contributor to the GHG emissions of the application, and offer an alternative infrastructural component and/or operational parameter that is known to be a less significant contributor to the estimated GHG emissions of the application.

For the embodiment illustrated in FIG. 4, the process 110 concludes with the processor 26 generating the response 60 indicating the estimated GHG emissions 120 of the application(s) when deployed in the virtualization environment 36. For embodiments in which the process 110 includes block 122, the response 60 may include the results of the additional analyses and/or recommendations regarding the estimated GHG emissions of the application(s) when deployed in the virtualization environment. In some embodiments, the GHG emissions are indicated in terms of volume or mass of carbon dioxide ($CO_2$) equivalent per time period (e.g., hour, day, week, quarter) that the application(s) is deployed and operating within the virtualization environment (e.g., kilograms of $CO_2$ per year). In certain cases, an application may be designed to scale within the virtualization environment in response to increased production traffic volume. For example, a scalable application may be hosted by a single virtual machine of the virtualization environment to support between 0 and 1000 active users, and may scale to additional virtual machines in response to additional active users. Since the infrastructural components and operational parameters of the application indicate the hardware (e.g., processors, memory, networking) components of the virtual machine, the scaling parameters (e.g., number of virtual machines per application instance, load balancers or other components to enable scaling), and the scaling conditions (e.g., a threshold number of active users per application instance), the GHG emissions estimation system 10 may determine the GHG emissions in terms of volume or mass of carbon dioxide ($CO_2$) equivalent per time period that the application is deployed within the virtualization environment and per a predefined number of active users (e.g., kilograms of $CO_2$ per year per thousand active users).

It may be appreciated that the process 110 of FIG. 4 may be performed at various times for various purposes. For example, in an embodiment, the process 110 may be executed as part of an application deployment process (e.g., a deployment pipeline of the software deployment platform 32) when a developed application is being prepared for deployment within the virtualization environment 36. In this manner, the GHG emissions of the application can be estimated prior to deployment. Additionally, the GHG emissions estimation system 10 may provide indications of infrastructural components and/or operational parameters of the application(s) that are the largest contributors to the estimated GHG emissions or recommendations for lowering the estimated GHG emissions, enabling the IAC files and/or source code of the application(s) to be modified to reduce the estimated GHG emissions prior to deployment.

In another example use case, the process 110 may be executed as part of an application development or design process. For example, in an early stage of an application design process, the application designers may be tasked with determining whether a first solution or a second solution should be developed based on a number of different cost/benefit factors including, for example, development cost, development time, and estimated GHG emissions. For this example, the IAC files of the first solution and the IAC files of the second solution may be defined without fully developing the source code, and the IAC files of each option may be provided as input to the process 110 to estimate the GHG emissions of each option when hypothetically deployed within the virtualization environment 36. As such, in certain embodiments, GHG emissions estimation system 10 may receive at least one request to estimate the GHG emissions for two applications being developed or deployed, and, in addition to providing the estimated GHG emissions of each option, may respond with a recommendation as to which of the two applications is more desirable to develop or deploy based on the GHG emissions. As such, the GHG emissions estimation system 10 enables the GHG emissions of different solutions to be estimated and considered for design and development decisions at an early phase of application design and development process. In an aspect, because the AI model may be trained on GHG emissions data from different virtual environment service providers, the GHG emissions estimates system 10 may provide not only recommendations on which of two applications is more desirable, but also provide recommendations on equivalent applications from other service providers that may achieve a similar performance while yielding more desirable GHG emissions.

It may be appreciated that the GHG emissions estimation system is not limited to the embodiments described above. For example, in certain embodiments, the AI model may instead be trained to directly learn or encode relationships between the IAC files of applications deployed within the virtualization environment and their corresponding measured or calculated GHG emissions. For such embodiments, the training dataset may include entries having the IAC files of a deployed application to be provided as input to the AI model during training, as well as the measured or calculated GHG emissions of the deployed application that is the corresponding desired output of the AI model during training. The trained AI model can then be provided with the IAC files of an application being developed or deployed as input, and in response, provide the estimated GHG emissions of the application when deployed within the virtualization environment.

The technical effects of the present disclosure include a GHG emissions estimation system that is designed to estimate the GHG emissions associated with operating a software application that is deployed (or is intended to be deployed) within a virtualized environment. For example, a software developer may utilize the GHG emissions estimation system as part of a cost/benefit analysis of different software solutions at an early stage of application design and development. Since there may be a variety of possible infrastructural options for a given software application, the GHG emissions estimation system enables the developer to estimate the GHG emissions associated with each infrastructural option, which can be used when determining which solution should be developed and deployed.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A computing system, comprising: at least one memory configured to store an artificial intelligence (AI) model; and at least one processor configured to execute stored instructions to perform actions comprising:

prior to deployment of an application, receiving a request from a deployment pipeline of a software deployment platform to determine estimated greenhouse gas (GHG) emissions of the application when deployed in a virtualization environment, wherein the request indicates at least one infrastructure-as-code (IAC) file of the application, and the request is part of a deployment process of the application;

identifying resource requirements associated with the application from the at least one IAC file, wherein the resource requirements indicate infrastructural components of a data center and operational parameters of the application corresponding to how the infrastructural components are used by the application during operation within the virtualization environment for execution of the application;

analyzing the resource requirements associated with the application to determine the infrastructural components of the data center that the application will use during operation within the virtualization environment by comparing a first set of one or more portions of the at least one IAC file to a first set of analysis rules corresponding to a set of infrastructural components and aggregating one or more infrastructural components of the set of infrastructural components that satisfy a condition of at least one analysis rule of the first set of analysis rules associated with the set of infrastructural components;

analyzing the resource requirements associated with the application to determine the operational parameters of the application corresponding to how the infrastructural components are used by the application during operation within the virtualization environment by comparing a second set of one or more portions of the at least one IAC file to a second set of analysis rules corresponding to a set of operational parameters and aggregating one or more operational parameters that satisfy a condition of at least one analysis rule of the second set of analysis rules associated with the set of operational parameters;

generating the estimated GHG emissions of the application when deployed in the virtualization environment by providing the infrastructural components and operational parameters of the application to the AI model that is trained using a global set of GHG emissions corresponding to a global set of infrastructural components and operational parameters of a respective global set of applications deployed in the virtualization environment, wherein the AI model is configured to generate the estimated GHG emissions by determining GHG emissions patterns associated with the determined infrastructural components and operational parameters of the application from the global set of infrastructural components and operational parameters;

providing a response to the request that includes the estimated GHG emissions of the application when deployed in the virtualization environment, wherein the response is provided to the deployment pipeline of the software deployment platform, and wherein the response enables the at least one IAC file to be modified, based on the estimated GHG emissions, prior to deploying the application in the virtualization environment; and completing the deployment pipeline of the software deployment platform by deploying the application in the virtualization environment.

2. The computing system of claim 1, wherein the request also indicates at least one source code file of the application.

3. The computing system of claim 1, wherein the at least one memory is configured to store an application analyzer having the first set of analysis rules, and wherein, to analyze the resource requirements associated with the application to determine the infrastructural components, the at least one processor is configured to execute stored instructions to perform actions comprising: applying each analysis rule of the first set of analysis rules to the first set of one or more portions of the at least one IAC file.

4. The computing system of claim 1, wherein the AI model is a decision tree model, a random forest (RF) model, a support vector machine (SVM) model, a linear regression model, an artificial neural network (ANN) model, a convolutional neural network (CNN) model, a recurrent neural network (RNN) model.

5. The computing system of claim 1, wherein the at least one processor is configured to execute stored instructions to perform actions comprising: before providing the response, analyzing the infrastructural components and operational parameters of the application and the estimated GHG emissions of the application to determine one or more recommendations to lower the estimated GHG emissions of the application, wherein the one or more recommendations are included in the response.

6. The computing system of claim 1, wherein the at least one processor is configured to execute stored instructions to perform actions comprising:

receiving a second request to determine a second estimated GHG emissions of a second application when deployed in the virtualization environment, wherein the second request indicates at least one second application file of the second application;

analyzing the at least one second application file of the second application to determine second infrastructural components and operational parameters of the second application;

generating, using the AI model, the second estimated GHG emissions of the second application when deployed in the virtualization environment, based on the second infrastructural components and operational parameters of the second application;

providing a second response to the second request that includes at least the second estimated GHG emissions of the second application when deployed in the virtualization environment; and comparing the estimated GHG emissions of the application and the second estimated GHG emissions of the second application and providing a recommendation to develop or deploy the application or the second application based on the comparison.

7. A computer-implemented method, comprising:

prior to deployment of an application, receiving a request from a deployment pipeline of a software deployment platform to determine estimated greenhouse gas (GHG) emissions of the application when deployed in a virtualization environment, wherein the request indicates at least one infrastructure-as-code (IAC) file of the application, and the request is part of a deployment process of the application;

identifying resource requirements associated with the application from the at least one IAC file, wherein the resource requirements indicate infrastructural components of a data center and operational parameters of the application corresponding to how the infrastructural components are used by the application during operation within the virtualization environment for execution of the application;

analyzing the resource requirements associated with the application to determine the infrastructural components of the data center that the application will use during operation within the virtualization environment by comparing a first set of one or more portions of the at least one IAC file to a first set of analysis rules corresponding to a set of infrastructural components and aggregating one or more infrastructural components of the set of infrastructural components that satisfy a condition of at least one analysis rule of the first set of analysis rules associated with the set of infrastructural components;

analyzing the resource requirements associated with the application to determine the operational parameters of the application corresponding to how the infrastructural components are used by the application during operation within the virtualization environment by comparing a second set of one or more portions of the at least one IAC file to a second set of analysis rules corresponding to a set of operational parameters and aggregating one or more operational parameters that satisfy a condition of at least one analysis rule of the second set of analysis rules associated with the set of operational parameters;

generating the estimated GHG emissions of the application when deployed in the virtualization environment by providing the infrastructural components and operational parameters of the application to an artificial intelligence (AI) model that is trained using a global set of GHG emissions corresponding to a global set of infrastructural components and operational parameters of a respective global set of applications deployed in the virtualization environment, wherein the AI model is configured to generate the estimated GHG emissions by determining GHG emissions patterns associated with the determined infrastructural components and operational parameters of the application from the global set of infrastructural components and operational parameters; providing a response to the request that includes the estimated GHG emissions of the application when deployed in the virtualization environment, wherein the response is provided to the deployment pipeline of the software deployment platform, and wherein the response enables the at least one IAC file to be modified, based on the estimated GHG emissions, prior to deploying the application in the virtualization environment; and completing the deployment pipeline of the software deployment platform by deploying the application in the virtualization environment.

8. The method of claim 7, wherein, analyzing the resource requirements associated with the application to determine the operational parameters of the application comprises: applying each analysis rule of the second set of analysis rules to the second set of one or more portions of the at least one IAC file.

9. The method of claim 7, wherein the AI model is a decision tree model, a random forest (RF) model, a support vector machine (SVM) model, a linear regression model, an artificial neural network (ANN) model, a convolutional neural network (CNN) model, a recurrent neural network (RNN) model.

10. The method of claim 7, comprising: before providing the response, analyzing the infrastructural components and operational parameters of the application and the estimated GHG emissions of the application to determine one or more recommendations to lower the estimated GHG emissions of the application, wherein the one or more recommendations are included in the response.

11. The method of claim 7, comprising:

receiving a second request to determine a second estimated GHG emissions of a second application when deployed in the virtualization environment, wherein the second request indicates at least one second application file of the second application;

analyzing the at least one second application file of the second application to determine second infrastructural components and operational parameters of the second application;

generating, using the AI model, the second estimated GHG emissions of the second application when deployed in the virtualization environment, based on the second infrastructural components and operational parameters of the second application;

providing a second response to the second request that includes at least the second estimated GHG emissions of the second application when deployed in the virtualization environment; and comparing the estimated GHG emissions of the application and the second estimated GHG emissions of the second application and providing a recommendation to develop or deploy the application or the second application based on the comparison.

12. A non-transitory, computer-readable medium storing instructions executable by a processor of a computing system, the instructions comprising instructions to:

prior to deployment of an application, receive a request from a deployment pipeline of a software deployment platform to determine estimated greenhouse gas (GHG) emissions of the application when deployed in a virtualization environment, wherein the request indicates at least one infrastructure-as-code (IAC) file of the application, and the request is part of a deployment process of the application;

identify resource requirements associated with the application from the at least one IAC file, wherein the resource requirements indicate infrastructural components of a data center and operational parameters of the application corresponding to how the infrastructural components are used by the application during operation within the virtual environment for execution of the application;

analyze the resource requirements associated with the application to determine the infrastructural components of the data center that the application will use during operation within the virtualization environment by comparing a first set of one or more portions of the at least one IAC file to a first set of analysis rules corresponding to a set of infrastructural components and aggregating one or more infrastructural components of the set of infrastructural components that satisfy a condition of at least one analysis rule of the first set of analysis rules associated with the set of infrastructural components;

analyze the resource requirements associated with the application to determine the operational parameters of the application corresponding to how the infrastructural components are used by the application during operation within the virtualization environment by comparing a second set of one or more portions of the at least one IAC file to a second set of analysis rules corresponding to a set of operational parameters and aggregating one or more operational parameters that satisfy a condition of at least one analysis rule of the second set of analysis rules associated with the set of operational parameters;

generate the estimated GHG emissions of the application when deployed in the virtualization environment by providing the infrastructural components and operational parameters of the application to an artificial intelligence (AI) model that is trained using a global set of GHG emissions corresponding to a global set of infrastructural components and operational parameters of a respective global set of applications deployed in the virtualization environment, wherein the AI model is configured to generate the estimated GHG emissions by determining GHG emissions patterns associated with the determined infrastructural components and operational parameters of the application from the global set of infrastructural components and operational parameters;

provide a response to the request that includes the estimated GHG emissions of the application when deployed in the virtualization environment, wherein the response is provided to the deployment pipeline of the software deployment platform, and wherein the response enables the at least one IAC file to be modified, based on the estimated GHG emissions, prior to deploying the application in the virtualization environment; and complete the deployment pipeline of the software deployment platform by deploying the application in the virtualization environment.

13. The non-transitory, computer-readable medium of claim 12, wherein the instructions further comprise instructions to determine one or more recommendations to lower the estimated GHG emissions of the application.

14. The non-transitory, computer-readable medium of claim 12, wherein the estimated GHG emissions comprise a volume or mass of carbon dioxide ($CO_2$) equivalent for a time period that the application is deployed within the virtualization environment based on a predefined number of active users.

15. A computing system, comprising:

at least one memory configured to store an artificial intelligence (AI) model; and at least one processor configured to execute stored instructions to perform actions comprising: training the AI model to encode relationships between respective infrastructural components and operational parameters of a set of deployed applications and respective greenhouse gas (GHG) emissions of the set of deployed applications, yielding a trained AI model, wherein the respective infrastructural components of the set of deployed applications comprise components of data centers that each respective deployed application used during operation within a respective virtualization environment, and the respective operational parameters of the set of deployed applications correspond to how each respective deployed application used the respective infrastructural components during operation within the respective virtualization environment;

prior to deploying an application in a virtualization environment, receiving a request from a deployment pipeline of a software deployment platform to determine estimated GHG emissions of the application when deployed in the virtualization environment;

receiving an infrastructure-as-code (IAC) file associated with the application to be deployed in the virtualization environment;

identifying, using the trained AI model, infrastructural components and operational parameters of the application based on the IAC file;

generating, using the trained AI model, estimated GHG emissions of the application when deployed in the virtualization environment, based on the infrastructural components and operational parameters of the application by determining GHG emissions patterns associated with the infrastructural components and operational parameters of the application from the respective infrastructural components and operational parameters of the set of deployed applications;

providing a response to the request that includes the estimated GHG emissions of the application when deployed in the virtualization environment, wherein the response is provided to the deployment pipeline of the software deployment platform, and wherein the response enables the IAC file to be modified, based on the estimated GHG emissions, prior to deploying the application in the virtualization environment; and completing the deployment pipeline of the software deployment platform by deploying the application in the virtualization environment.

16. The computing system of claim 15, wherein the at least one memory is configured to store a training dataset having a plurality of entries, each indicating the respective infrastructural components and operational parameters of a deployed application to be provided as input to the AI model during training, and each indicating the respective GHG emissions of the deployed application that is desired as output from the AI model in response to the input during training.

17. The computing system of claim 16, wherein, to train the AI model, the at least one processor is configured to execute stored instructions to perform actions comprising:

for each entry of the plurality of entries:

(A) providing, as input to the AI model, the respective infrastructural components and operational parameters indicated for the deployed application by the entry, and in response receiving, as output, estimated GHG emissions of the deployed application, (B) calculating a difference between the estimated GHG emissions of the deployed application and the respective GHG emissions indicated for the deployed application by the entry, and (C) in response to determining that the difference is greater than a predefined threshold value, modifying one or more parameters of the AI model and returning to step (A); and storing the one or more parameters as the trained AI model.

18. The computing system of claim 16, wherein, to generate the training dataset, the at least one processor is configured to execute stored instructions to perform actions comprising: for each deployed application of a set of deployed applications:

determining the respective infrastructural components and operational parameters of the deployed application;

determining the respective GHG emissions of the deployed application; and generating an entry of the training dataset that includes the respective infrastructural components and operational parameters of the deployed application and includes the respective GHG emissions of the deployed application.

19. The computing system of claim 15, wherein the at least one processor is configured to execute the stored instructions to perform actions comprising receiving the IAC file associated with the application to be deployed in the virtualization environment based on a request from a deployment pipeline of a software deployment platform to prepare the application for deployment in the virtualization environment.

20. The computing system of claim 15, wherein the set of deployed applications corresponds to a plurality of virtualization environment service providers, and wherein the at least one processor is configured to train the AI model to encode relationships between the respective infrastructural components and operational parameters of the set of deployed applications and the respective GHG emissions of the set of deployed applications based on generating associations among different infrastructure components and operational parameters corresponding to different virtualization environment service providers.

* * * * *